United States Patent
Matsunaga et al.

(10) Patent No.: US 7,840,308 B2
(45) Date of Patent: Nov. 23, 2010

(54) ROBOT DEVICE CONTROL BASED ON ENVIRONMENT AND POSITION OF A MOVABLE ROBOT

(75) Inventors: Shinichi Matsunaga, Wako (JP); Nobuo Higaki, Wako (JP); Takahiro Oohashi, Wako (JP); Yuichi Yoshida, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 1328 days.

(21) Appl. No.: 11/221,903

(22) Filed: Sep. 9, 2005

(65) Prior Publication Data
US 2006/0058920 A1    Mar. 16, 2006

(30) Foreign Application Priority Data
Sep. 10, 2004   (JP)   ............................ 2004-263239
Sep. 29, 2004   (JP)   ............................ 2004-283782

(51) Int. Cl.
G05B 19/18    (2006.01)
(52) U.S. Cl. ........................ 700/254; 700/11; 700/12; 700/13; 700/19; 700/28; 700/29; 700/30; 700/31; 700/52; 700/250; 700/251; 700/253; 701/24; 701/28; 701/36; 701/208
(58) Field of Classification Search .................... 701/23, 701/25, 28, 208, 211, 24, 36; 700/11, 12, 700/13, 19, 28, 29, 30, 31, 52, 250, 251, 700/253, 254
See application file for complete search history.

(56) References Cited

U.S. PATENT DOCUMENTS

| | | | | |
|---|---|---|---|---|
| 5,363,305 A | * | 11/1994 | Cox et al. | 701/200 |
| 5,378,969 A | * | 1/1995 | Haikawa | 318/568.12 |
| 5,525,882 A | * | 6/1996 | Asaka et al. | 318/568.16 |
| 5,711,388 A | * | 1/1998 | Davies et al. | 180/168 |
| 5,793,900 A | * | 8/1998 | Nourbakhsh et al. | 382/263 |
| 5,896,488 A | * | 4/1999 | Jeong | 700/255 |
| 5,963,254 A | * | 10/1999 | Kim et al. | 348/363 |
| 5,974,348 A | * | 10/1999 | Rocks | 701/28 |
| 5,995,884 A | * | 11/1999 | Allen et al. | 701/24 |

(Continued)

FOREIGN PATENT DOCUMENTS

JP    5-134694    5/1993

(Continued)

OTHER PUBLICATIONS

Japanese Office Action 2004-263239 dated Feb. 17, 2009.

*Primary Examiner*—Thomas G Black
*Assistant Examiner*—Sze-Hon Kong
(74) *Attorney, Agent, or Firm*—Squire, Sanders & Dempsey L.L.P.

(57) ABSTRACT

The control apparatus for a movable robot comprises: environment information acquisition means (such as video camera 3 and microphone 4); a current position detecting means (15); a map storage (7); a control parameter storage (9) for storing control parameters adjusted to different environments; and control means (11, 12) for determining a current position of the robot on the map data based on a signal from the current position detecting means, retrieving control parameters suitable for the current position from the parameter storage, and controlling the environment information acquisition means or actuators for moving the robot by using the retrieved control parameters.

2 Claims, 5 Drawing Sheets

U.S. PATENT DOCUMENTS

| | | | | |
|---|---|---|---|---|
| 6,496,755 | B2* | 12/2002 | Wallach et al. | 700/245 |
| 6,560,512 | B1* | 5/2003 | Rosen et al. | 700/258 |
| 6,643,376 | B1* | 11/2003 | Ackerman et al. | 381/56 |
| 6,728,608 | B2* | 4/2004 | Ollis et al. | 701/28 |
| 6,853,732 | B2* | 2/2005 | Scofield | 381/27 |
| 6,922,632 | B2* | 7/2005 | Foxlin | 701/207 |
| 7,054,716 | B2* | 5/2006 | McKee et al. | 700/245 |
| 7,054,718 | B2* | 5/2006 | Miyamoto et al. | 700/258 |
| 7,085,635 | B2* | 8/2006 | Boman et al. | 701/36 |
| 7,108,731 | B2* | 9/2006 | Park et al. | 55/356 |
| 7,162,056 | B2* | 1/2007 | Burl et al. | 382/104 |
| 7,184,586 | B2* | 2/2007 | Jeon et al. | 382/153 |
| 7,188,000 | B2* | 3/2007 | Chiappetta et al. | 700/245 |
| 7,277,559 | B2* | 10/2007 | Matsunaga et al. | 382/103 |
| 7,418,312 | B2* | 8/2008 | Hidai et al. | 700/245 |
| 7,693,288 | B2* | 4/2010 | Mergler | 381/58 |
| 7,725,253 | B2* | 5/2010 | Foxlin | 701/207 |
| 2004/0076302 | A1* | 4/2004 | Christoph | 381/57 |
| 2004/0093219 | A1* | 5/2004 | Shin et al. | 704/275 |
| 2004/0111273 | A1* | 6/2004 | Sakagami et al. | 704/277 |
| 2004/0230340 | A1* | 11/2004 | Fukuchi et al. | 700/245 |
| 2005/0000543 | A1* | 1/2005 | Taylor et al. | 134/18 |
| 2005/0010331 | A1* | 1/2005 | Taylor et al. | 700/245 |
| 2005/0022331 | A1* | 2/2005 | Kim et al. | 15/319 |
| 2005/0105769 | A1* | 5/2005 | Sloan et al. | 382/103 |
| 2006/0002571 | A1* | 1/2006 | Holloway et al. | 381/104 |
| 2006/0047361 | A1* | 3/2006 | Sato et al. | 700/245 |
| 2006/0064202 | A1* | 3/2006 | Gutmann et al. | 700/245 |

FOREIGN PATENT DOCUMENTS

| | | | |
|---|---|---|---|
| JP | 06080203 | A * | 3/1994 |
| JP | 2000-163098 | | 6/2000 |
| JP | 2001/347476 | A | 12/2001 |
| JP | 2003-289546 | | 10/2003 |
| JP | 2005/111654 | A | 4/2005 |

* cited by examiner

ROBOT DEVICE CONTROL BASED ON ENVIRONMENT AND POSITION OF A MOVABLE ROBOT

TECHNICAL FIELD

The present invention relates to a control apparatus for a robot that can move autonomously while gathering information of the surrounding environment. The present invention also relates to a control apparatus for a moveable robot equipped with sound recognition means for identifying a target sound(s) from an input to sound input means.

BACKGROUND OF THE INVENTION

Bipedal humanoid robots that can move autonomously while recognizing the surrounding conditions (environment) based upon visual information obtained by a video camera and auditory information obtained by a microphone are known in the art. In a case such as when the movable robot identifies a particular object from the image(s) taken by a CCD camera, for example, parameters regarding imaging sensitivity such as an input gain, white balance setting, etc. can affect significantly to proper image acquisition. Therefore, in order to improve the object identification ability of the robot, it is important to appropriately set the parameters depending on the environment conditions inclusive of the type, brightness, etc. of the light source.

To achieve automatic adjustment of the parameters, Japanese Patent Application Laid-Open Publication No. 2003-289546 (US Publication Number US-2003-0160877-A1) has proposed an imaging device that adjusts the white balance setting by placing a calibration plate in front of the lens at an appropriate timing.

In the prior art technique disclosed in the above publication, however, there is a problem that the robot has to always carry the calibration plate. Also, because the calibration is conducted when the acquired image is found to be unsatisfactory, it is difficult to promptly adjust the parameters to a change in the environment.

Also, it is desired to improve sound-based interactive communication ability of such humanoid robots to increase affinity between robots and people in general life situations and improve work efficiency.

As a sound recognition technique that can be applied to such an interactive communication function, Japanese Patent Application Laid-Open Publication No. 5-134694 has proposed a technique in which when comparing a pattern of sound input to the sound input device with a predetermined reference pattern to detect target sounds or voices, the reference pattern is set to include environmental noise so as to avoid influence from the noise. Japanese Patent Application Laid-Open Publication No. 2000-163098 has proposed to estimate the noise spectrum to eliminate the noise component from the input sound.

However, when the sound recognition is performed on the sound collected by the microphone, which is typically mounted to a head portion of the robot, noises emitted from the robot itself, such as rotation sound of servomotors provided at joints of arms and legs, rotation sound from a cooling fan for an electronic control unit (ECU), operating sounds of other moving parts and sound of footsteps of the robot, can unfavorably influence the sound recognition. For instance, in a robot developed by the assignee of the present application, the sound of footsteps (or the sound generated when the foot hits the floor as the robot walks around) was found to have loudness and waveform similar to those of Japanese casual exclamation of greeting "Oi" uttered from about one meter apart from the robot (see FIG. 5).

Thus, the prior art approach for preventing noise from affecting the sound recognition disclosed in the above publications can be ineffective in coping with irregularly generated noises and/or noises having a similar pattern to that of target sounds, and therefore, adopting the approach may not necessarily lead to more reliable discrimination of a human voice from the surrounding noise.

BRIEF SUMMARY OF THE INVENTION

In view of such problems of the prior art, a primary object of the present invention is to provide a control apparatus for a movable robot that can promptly vary the control parameters to optimum values in response to an environmental change, and can allow the robot to automatically conduct an appropriate action suitable for the current environment, particularly those is which there is a person or persons around the robot.

A second object of the present invention is to provide a control apparatus for a movable robot that can perform sound recognition without being hampered by operating noises generated from the robot itself.

According to the present invention, such objects can be accomplished by providing a control apparatus for a movable robot, comprising: means for acquiring environment information; means for detecting a current position of the robot; a map storage for storing map data containing information regarding arrangement of passages and fixtures in regions in which the robot may move; a parameter storage for storing control parameters adjusted to different environments; and control means for determining a current position of the robot on the map data based on a signal from the current position detecting means, retrieving control parameters suitable for the current position from the parameter storage, and controlling the means for acquiring environment information or actuators for moving the robot by using the retrieved control parameters.

When the means for acquiring environment information comprises a camera, the control parameters may comprise a parameter pertaining sensitivity settings of the camera such as an input gain and white balance setting of the camera. If the means for acquiring environment information comprises a microphone, the control parameters can comprise a parameter pertaining sensitivity setting of the microphone such as an input gain and frequency response characteristics of a noise filter. In the case that the robot comprises a loudspeaker for emitting sound, the control parameters may comprise a parameter pertaining an output level of the loudspeaker. Further, if the robot consists of a legged walking robot, then the control parameters may comprise a parameter pertaining conditions of a floor surface.

According to the above structure of the control apparatus of the present invention, it is possible to readily provide the robot with appropriate control parameters in conjunction with the map information. Therefore, the sensitivity of the camera and/or microphone, output level of the loudspeaker or moving properties of the robot can be promptly adjusted to an environment into which the robot has moved. This can improve the visual and auditory object identification abilities of the robot, and also allows more reliable verbal communication ability under large noise conditions. Further, because the robot is controlled using the control parameters prepared beforehand, the computational load in the robot control can be significantly reduced, resulting in a higher response speed. Particularly, if at least one of the map storage and the parameter storage is comprised in a robot assisting server adapted to be able to communicate with the robot, the computational load on the robot side can be reduced even further.

According to another aspect of the present invention, there is provided a control apparatus for a moveable robot, comprising: a behavior control unit for controlling a behavior of the robot; means for detecting a motion state quantity representing a motion of a movable part of the robot; sound input means; and sound recognition means for identifying a target sound from an input to the sound input means, wherein the sound recognition means identifies an operating sound of the robot from the input to the sound input means based upon the motion state quantity from the means for detecting a motion state variable, and wherein the behavior control means controls the behavior of the robot so as to reduce the operating sound based upon a result of identification of the operating sound.

Particularly, if the robot consists of a legged walking robot, the behavior control unit may change a gait of the robot based upon the result of identification of the operating sound. The behavior control unit may make the robot turn to face a sound source and walk toward the sound source based upon the result of identification of the operating sound. If the robot comprises a cooling fan, the behavior control unit may control airflow of the cooling fan based upon the result of identification of the operating sound. Further, in the case that the robot comprises a loudspeaker or emitting sound, when it is determined from the result of identification of the operating sound that the operating sound of the robot overlaps a voice from a person, the behavior control unit preferably generates a verbal request through the loudspeaker for prompting the person to speak to the robot again.

According to the above arrangement of the present invention, because the operating sound emitted from the robot itself is identified by using the motion state quantity of a moveable part of the robot, and the robot is controlled to reduce the indentified operating sound, it is possible to prevent the operating sound of the robot from hampering the recognition of target sounds. When the indentified operating sound is a footstep sound of the robot, for example, the robot can be controlled to suspend walking so as not to generate footstep sounds.

Particularly, more reliable sound recognition can be achieved by changing the gait of the robot to reduce the footstep sound, by making the robot turn to face the sound source (e.g., a person) and move toward the sound source to receive a louder sound therefrom, and/or by decreased the rotation speed of the cooling fan to reduce the noise emitted therefrom. Also, when it is determined that the operating sound of the robot overlaps a voice from a person, the robot control apparatus can make the robot generated a verbal request for asking the person to speak to the robot again. This can result in a higher chance of successful verbal communication between the robot and the person.

Other and further objects, features and advantages of the invention will appear more fully from the following description.

BRIEF DESCRIPTION OF THE DRAWINGS

Now the present invention is described in the following with reference to the appended drawing, in which.

DETAILED DESCRIPTION OF THE PREFERRED EMBODIMENTS

Figure 1:
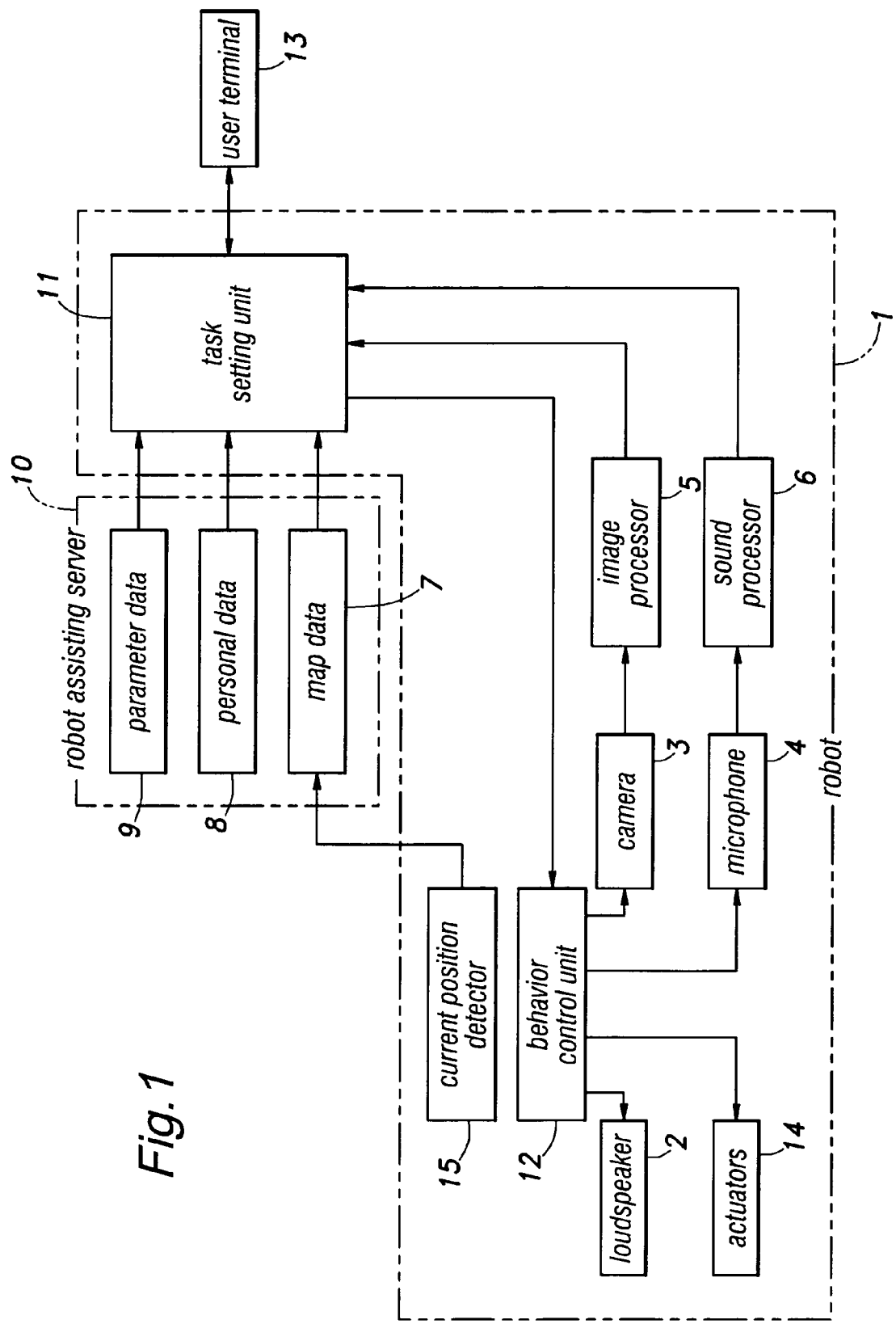
FIG. 1 is a block diagram showing a general structure of an embodiment of a control apparatus for a movable robot according to the present invention.

FIG. 1 is a block diagram showing a general structure of a robot to which the present invention is applied. This robot 1 is equipped with a loudspeaker 2, video camera 3, and a microphone 4, and an image signal from the video camera 3 is input to an image processor 5 and a sound signal from he microphone 4 is input to the sound processor 6. The loudspeaker 2 outputs a sound signal generated by an appropriate sound synthesis unit.

The video camera 3 comprises a monochromatic or color imaging device and a motor for conducting pan (lateral direction) and tilt (up and down direction) actions. The image signal from the video camera 3 is digitized by a frame grabber and a moving object is extracted from a difference between two frames which are adjacent to each other or which interpose a certain number of frames therebetween. Also, when a pair a video cameras 3 (right and left) are used for obtaining a stereoscopic vision, a distance to a target object can be computed based upon the images from the pair of video cameras 3. Further, an optical flow acquired from the image information is used to obtain a contour of a person and/or position of a moving object, and the image processing is conducted to achieve face recognition.

The sound processor 6 functions to remove background noise and reverberation components to facilitate extraction of target sounds. Further, the sound processor 6 determines from a rising edge of the input sound if the sound is a vocal sound uttered by a person or the sound has resulted from collision between some objects. When a pair of microphones 3 are used, a position of a sound source is determined based upon a difference in the sound pressure and arrival time between the pair of microphones 3.

The robot 1 is adapted to receive various information form a robot assisting server 10, which comprises: a map data storage 7 for storing map data representing an arrangement of passages and fixtures in regions in which the robot 1 may move around; a personal data storage 8 for storing personal data consisting of general information such as identification number (ID), name, sex, birth date and blood type, occupational information such as accompany name, division, post, telephone number, mail address and terminal information, a facial data for indentifying a face; and a parameter data storage 9 for storing control parameters in accordance with the environmental data such as the type of light, brightness, average noise level, reverberation characteristics, and hardness of the floor in each of the regions defined on the map.

In the robot 1, a task setting unit 11 sets a traveling route based upon the environment data (such as images and sound), map data and personal data. The task setting unit 11 also determines the behavior of the robot 1 and provides a behavior control unit 12 with operational instructions to be carried out. The image signal from the image processor 5 and the sound signal from the sound processor 6 are directly input to the task setting unit 11, which also refers to the map data provided from the map data storage 7 to determine if there is any obstacle or person around the robot 1 and when necessary, provides the behavior control unit 12 with instructions to change the traveling speed and/or route of the robot 1 so as to avert collision with the obstacle or person.

Connected to the task setting unit 11 is a user terminal 13 consisting of a personal computer equipped with an input device such as a keyboard or touch panel and a monitor such as a liquid crystal display. The terminal 13 is used as a user interface for allowing an operator to give the robot 1 with directions such as "start", "stop", and "return to the home position" to thereby remote-control the robot 1. The terminal 13 is also used for monitoring the operational state of the robot 1 inclusive of the image from the video camera 3, sound from the microphone 4 and settings of the control parameters. Further, the operator can enter or update the control parameters as well as various information thought the terminal 13.

The behavior control unit 12 controls the behavior of the robot 1 by providing actuators (e.g., servormotors) 14 at joints of movable parts such as arms and legs with action command values set in accordance with the operational instructions from the task setting unit 11. Particularly, the behavior control unit 12 receives instructions specifying the step length and number of steps (gait) and accordingly controls the actuators at leg joints.

A current position detector 15 detects the traveling distance and angle of directional change of the robot 1, and based upon them as well as the signal from GPS and/or a position correcting device using a gyrocompass, geomagnetic sensor or gas rate sensor, computes the current position of the robot 1. This current position data is fed to the task setting unit 11 via the map data storage 7. The task setting unit 11 then compares the target position with the current position to adjust the traveling route of the robot 1.

Figure 2:
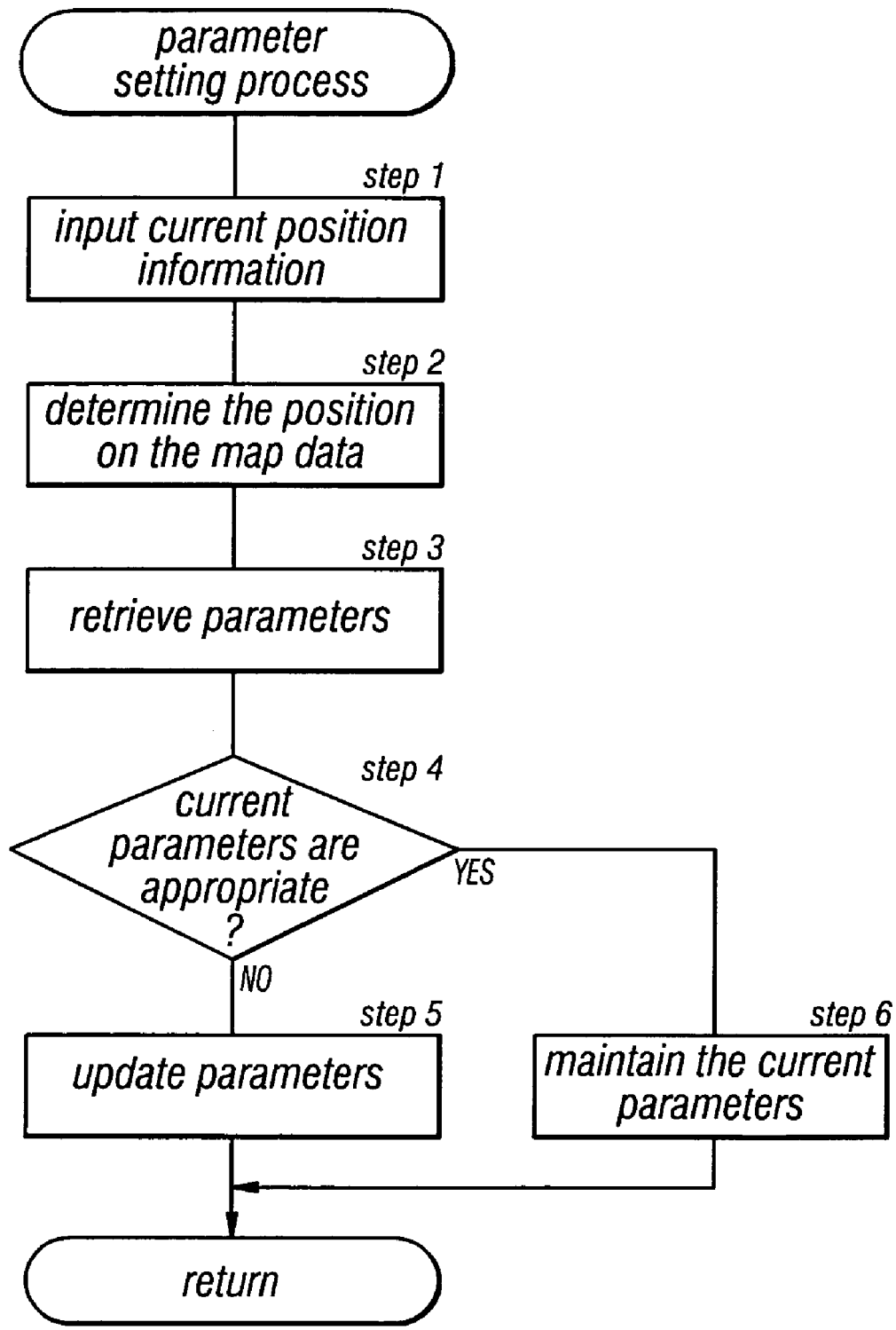
FIG. 2 is a flowchart showing a process for setting control parameters according to the present invention.

FIG. 2 is a flowchart showing the process of parameter setting carried out in the robot 1 to automatically optimize the control parameters. This process is carried out at an appropriate sampling interval through the task setting unit 11. Under the control of the task setting unit 11, the current position data of the robot 1 is input to the map data storage 7 (step 1), and the current position of the robot 1 is determined on the map (step 2). Subsequently, the parameter data storage 9 retrieves optimum control parameters according to the current position or environment (step 3). Then, it is determined whether the current control parameters are appropriate or not (step 4), and if it is determined that the parameters need to be updated, then instructions for changing the parameters are provided to the behavior control unit 12 (step 5) and if not, the current conditions are maintained (step 6).

The control parameters are predetermined corresponding to the regions on the map. For example, the optimum value (or setting) of the input gain and white balance setting of the video camera 3 can vary depending on the color and/or material of the ceiling and walls, size of the window(s), type of the illumination light, etc, Thus, the optimal values of the parameters in each region are measured beforehand and stored in the parameter data storage 9 so that can be readily used with or without adjustment depending on the weather and/or time. This allows an appropriate image signal to be obtained in accordance with the current position of the robot 1.

In the case of a sound signal, the noise level, reverberation characteristics and so on are measures for each region and the value of parameters such as input gain and frequency response of the noise filter are set corresponding to the measured values and stored in the parameter data storage 9. The output level of the loudspeaker is also set for each region corresponding to the measured noise level and stored in the parameter data storage 9. This allows easier extraction of target sounds from the noise and at the same time achieves more reliable message transmission with a higher loudspeaker output level set for a region having higher noise level.

The data regarding the condition of the floor may be also obtained beforehand particularly when the robot 1 consists of a legged walking robot. this can allow an optimum gait to be automatically achieved. For instance, when the robot 1 walks in a region having a hard floor, where an impact force and hence sound generated when the foot hits the floor tends to be larger, the step length of the robot 1 is reduce, making the robot 1 almost slide its feet, to thereby minimize the sound generated. On the other hand, when the floor is covered with a carpet, it is possible to allow setting the step length at its maximum so that a higher traveling speed can be achieved. The provision of the data regarding the conditions of the floor of each region allows the quick change of the gait when the floor condition changes as the robot 1 moves, which can lead to a steadier walk of the robot. Also, an optimal gait corresponding to the floor condition can reduce an amount of feedback for counterforce control, and this can reduce the amount of data processing required for gain control.

Figure 3:
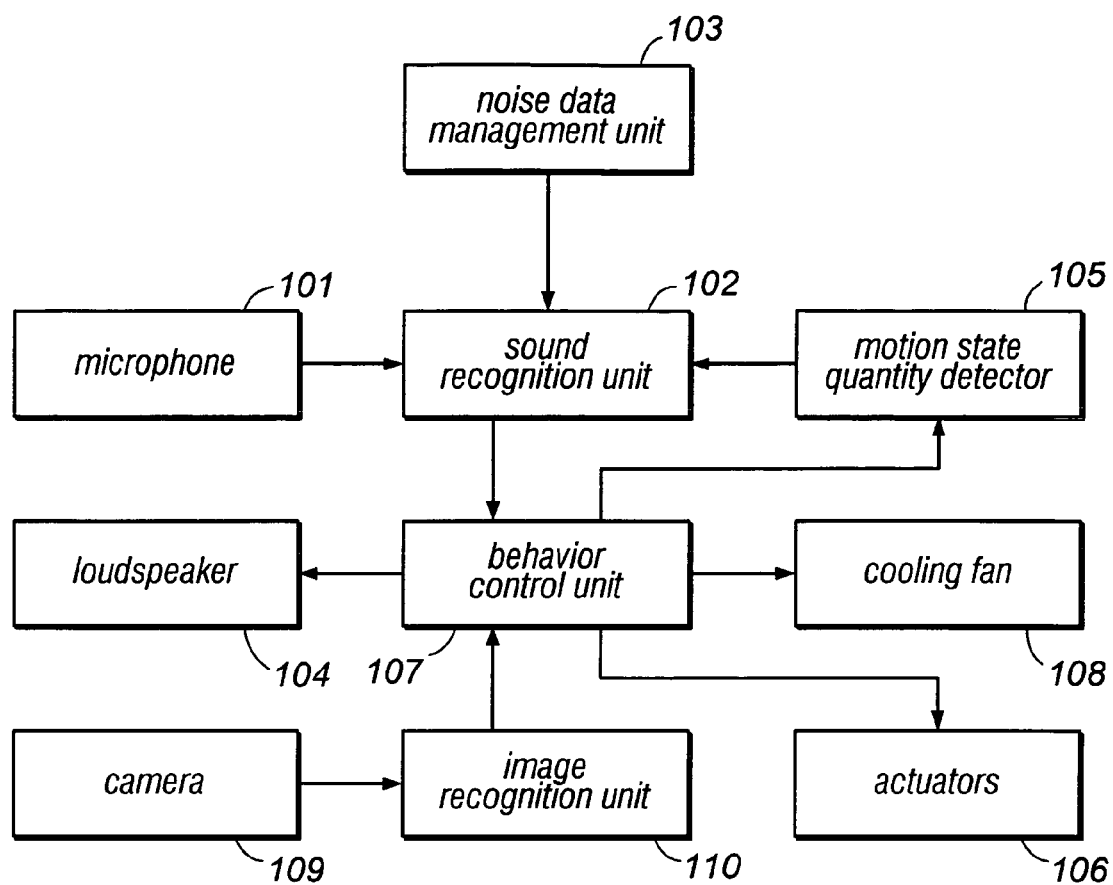
FIG. 3 is a block diagram showing a general structure of an embodiment of a control apparatus for a movable robot according to another aspect of the present invention.

FIG. 3 is a block diagram showing a general structure of another embodiment of a movable robot to which the present invention is applied. This robot comprises a pair of microphones 101 mounted to a head portion thereof. A sound signal from the microphones 1 is input to a sound recognition unit 102, which locate a sound source based upon a difference in the sound pressure and arrival time between the pair of microphones 101.

The sound recognition unit 102 refers to various parameters such as an input gain, frequency response of a noise filter and output level of a loudspeaker 104 stored in a noise data management unit 103, where the parameters are determined corresponding to the noise level of the environment in which the robot is positioned. The sound recognition unit 102 also receive signals (motion state quantities) representing motions of movable parts such as legs and arms of the robot form a motion state quantity detector 105 so that the unit 102 can easily identify operating sounds generated by the robot, such as the sound of robot's footsteps and the sound from actuators 106 disposed at joints of legs and arms, for example, to thereby separate them from target sounds. The sound recognition unit 102 determines from the waveform of the input sound whether the sound is a voice emitted from a person or an impact sound generated from colliding objects, and in the former case, compares the pattern of the voice from the person with reference patterns to understand the contents thereof. the motion state quantity detector 105 may also detect or compute the traveling speed of the robot 1 as a motion state quantity.

A behavior control unit 107 provides the actuators 106 with action command values in accordance with prescribed operational instructions, to thereby control the behavior of the robot. Particularly, based upon the results of sound discrimination of the sound recognition unit 102, the behavior control unit 107 can make the robot conduct a silent-mode walk by, for example, reducing the step length, lowering the center of weight to make the impact when the foot hits the floor smaller, and/or decreasing the traveling speed to make the interval between adjacent footsteps longer. Further, the behavior control unit 107 can make the loudspeaker 104 emit a vocal signal synthesized by an appropriate voice synthesis means or control the airflow of a cooling fan 108 for an electronic control unit (ECU) so as to minimize the noise or operating sound emitted from the robot.

The robot also comprises a camera 109 and an image recognition unit 110 for analyzing the images taken by the camera 109 to deduce the distance to a voice-emitting person, recognize the gesture of the person and motion of the person's mouth, and indentify the person, whereby based upon the acquired information, the behavior control unit 107 issues commands for operating the robot appropriately corresponding to the information.

Figure 4:
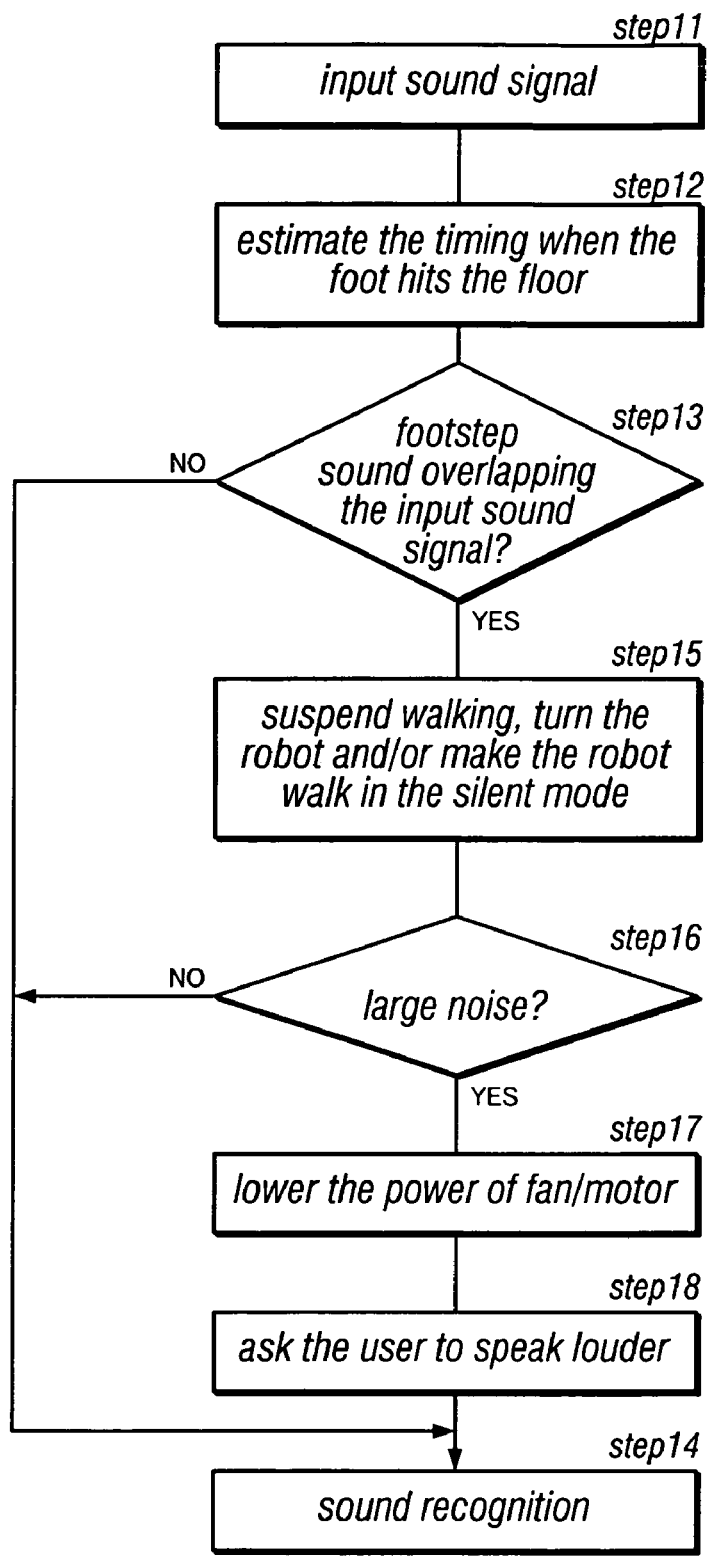
FIG. 4 is a flowchart showing a sound recognition process according to the present invention.
Figure 5:
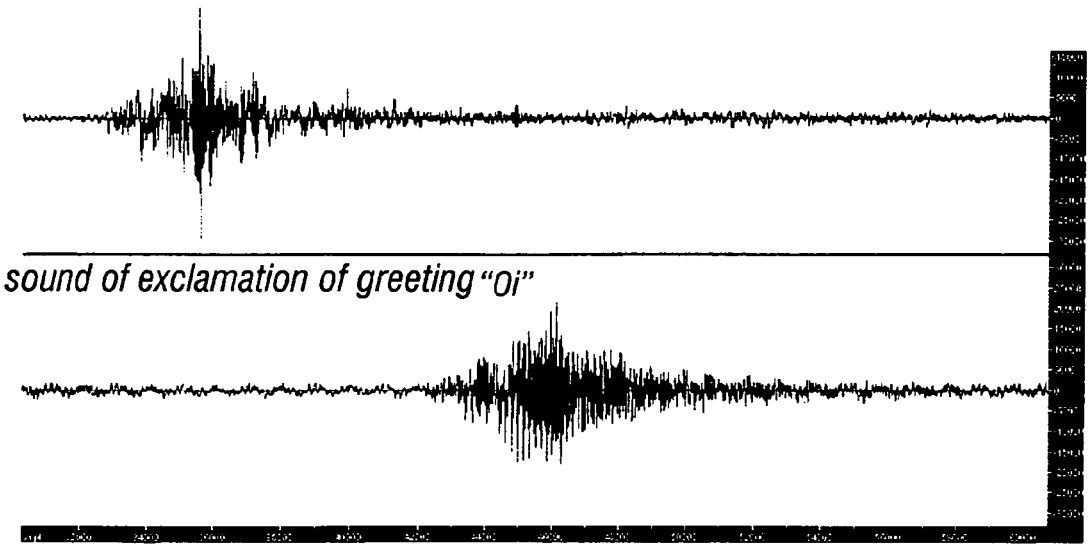
FIG. 5 shows exemplary sound waveforms input to a microphone mounted in a head portion of a robot.

Next, the process regarding the sound recognition according to the present invention will be described with reference to FIG. 4. In step 11, a sound signal is input to the sound recognition unit 102 via microphones 101, and a timing when the foot of the robot hits the floor is estimated or predicted based upon the motion state quantity of the leg obtained from the action command values for the behavior control unit 107 (step 12). Then, it is determined if there is a footstep sound overlapping the input sound signal (step 13) by using the estimated timing of the foot hitting the floor. The sound recognition unit 102 avoids locating the sound source at the estimated timing of the foot hitting the floor. If it is determined that the input sound signal is received independently from the footstep sound in step 13, the process goes to step 14 to perform sound recognition to identify target sounds, such as a name of the robot, contained in the input sound signal. On the other hand, if it is determined in step 13 that there is a footstep sound overlapping the input sound signal, it is judged that a satisfactory recognition of the input sound is difficult, and an action is taken such as suspending the motion of the robot, turning the robot (or head or the robot) to face the sound source and/or making the robot walk in the silent mode toward the sound source (step 15).

The surrounding noise level is also evaluated (step 16), and when the noise level is high, the power of the cooling fan 108 for the electronic control unit and/or servomotors 106 disposed at various joints of the robot is lowered to a minimum (step 17), thereby reducing the noise emitted from the robot itself and allowing the target sounds to be identified more easily.

As a case may be, the robot can make a verbal request through the loudspeaker 104 for asking a person nearby to speak louder (step 18).

Thus, by evaluating the sound signal input to the sound recognition unit 102 before performing sound recognition thereon and make the robot take appropriate actions in accordance with the evaluation result, it is possible to prevent the noise emitted from the robot from hampering the correct recognition of target sounds and promote the high-level verbal communication between the robot and person.

Although the present invention has been described in terms of preferred embodiments thereof, it is obvious to a person skilled in the art that various alterations and modifications are possible without departing from the scope of the present invention which is set forth in the appended claims.

The invention claimed is:

1. A control apparatus for a movable robot, comprising:
    an acquiring unit configured to acquire environment information, the acquiring unit including at least one of a camera and a microphone;
    a detector configured to detect a current position of the robot;
    a map storage configured to store map data containing information regarding arrangement of passages and fixtures in regions in which the robot may move;
    a parameter storage configured to store control parameters adjusted to different environments, wherein the control parameters comprising a sensitivity of the microphone, a sensitivity of the camera and an output level of a loudspeaker; and
    a control unit configured to determine a current position of the robot on the map data based on an output of the detector, retrieve control parameters corresponding to the current position of the robot from the parameter storage, update the current control parameters of the robot with the retrieved control parameters when the current control parameters are inappropriate for the current position, and use the current control parameters when the current control parameters are appropriate for the current position.

2. The control apparatus for a movable robot according to claim 1, wherein at least one of the map storage and the parameter storage is comprised in a robot assisting server adapted to be able to communicate with the robot.

\* \* \* \* \*